(12) United States Patent
Ozawa et al.

(10) Patent No.: US 7,097,056 B2
(45) Date of Patent: Aug. 29, 2006

(54) NECK OF SYNTHETIC RESIN BOTTLE

(75) Inventors: Tomoyuki Ozawa, Tokyo (JP); Toshimasa Tanaka, Tokyo (JP); Takao Iizuka, Tokyo (JP); Makoto Takada, Matsudo (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 0 days.

(21) Appl. No.: 10/514,444

(22) PCT Filed: Aug. 11, 2003

(86) PCT No.: PCT/JP03/10190

§ 371 (c)(1),
(2), (4) Date: Dec. 14, 2004

(87) PCT Pub. No.: WO2004/014744

PCT Pub. Date: Feb. 19, 2004

(65) Prior Publication Data

US 2005/0150856 A1    Jul. 14, 2005

(30) Foreign Application Priority Data

| Aug. 9, 2002 | (JP) | ............................. 2002-234092 |
| Aug. 9, 2002 | (JP) | ............................. 2002-234093 |
| Feb. 28, 2003 | (JP) | ............................. 2003-054694 |
| Feb. 28, 2003 | (JP) | ............................. 2003-054821 |

(51) Int. Cl.
*B65D 1/02* (2006.01)
*B29C 49/00* (2006.01)

(52) U.S. Cl. ........................ 215/44; 215/42; 215/902; 220/296; 220/913

(58) Field of Classification Search ................. 215/40, 215/42–44, 332, 902; 220/296, 360, 913
See application file for complete search history.

(56) References Cited

U.S. PATENT DOCUMENTS

| 1,866,770 | A | * | 7/1932 | Hilgenberg | ................... | 215/44 |
| 4,007,848 | A | * | 2/1977 | Snyder | ........................ | 215/44 |
| 4,589,559 | A | * | 5/1986 | Hayashi et al. | ................ | 215/42 |
| 4,620,640 | A | * | 11/1986 | Swartzbaugh | ................ | 215/217 |
| 4,747,502 | A | * | 5/1988 | Luenser | ....................... | 215/307 |
| 5,261,545 | A | * | 11/1993 | Ota et al. | ...................... | 215/42 |
| 5,431,291 | A | * | 7/1995 | LaBombarbe, Jr. | ........... | 215/44 |
| 5,462,186 | A | * | 10/1995 | Ladina et al. | ................ | 215/330 |
| 5,553,727 | A | * | 9/1996 | Molinaro | ...................... | 215/44 |
| 5,673,808 | A | * | 10/1997 | Valyi et al. | .................. | 215/252 |
| 6,006,930 | A | * | 12/1999 | Dreyer et al. | .................. | 215/44 |
| 6,635,325 | B1 | * | 10/2003 | Hebert | ..................... | 428/36.91 |

FOREIGN PATENT DOCUMENTS

| JP | A 63-192216 | 8/1988 |
| JP | A 9-29824 | 2/1997 |
| JP | A 10-157752 | 6/1998 |

* cited by examiner

*Primary Examiner*—Sue A. Weaver
(74) *Attorney, Agent, or Firm*—Oliff & Berridge, PLC (57) ABSTRACT

The gas-venting groove or grooves are formed, while leaving a part of the thread ridge up to a certain height, as the vertical degassing paths in the thread ridge carved on the outer surface of the round neck wall and the entire neck is whitened by the thermal crystallization. This thermal crystallization is conducted under the condition that the neck is prevented from undesired deformation caused by uneven resin flow state. Thus, the object of this invention is to provide a highly safe neck that can be used widely in the field of heat-resistant containers, pressure-tight containers, and heat-resistant and pressure-tight containers.

8 Claims, 12 Drawing Sheets

Fig. 12
Related Art

NECK OF SYNTHETIC RESIN BOTTLE

TECHNICAL FIELD

This invention relates to a neck structure of the synthetic resin bottle that is drawn and blow-molded from a polyethylene terephthalate resin and the like.

BACKGROUND ART

Japanese patent application No. P1998-58527 includes a description on a biaxially drawn, blow-molded bottle made of a polyethylene terephthalate resin (hereinafter referred to as PET bottle) and used for the beverage products, such as tea and fruit juices, and the like, which require a filling operation at a high temperature or a thermal treatment process. The so-called heat-resistant neck has high thermal deformation resistance strengthened by the thermal crystallization treatment, and is used as the neck of the PET bottle which is to be filled with tea, fruit juice, liquid seasoning and the like at a high temperature, or is subjected to a thermal treatment process.

Figure 10:
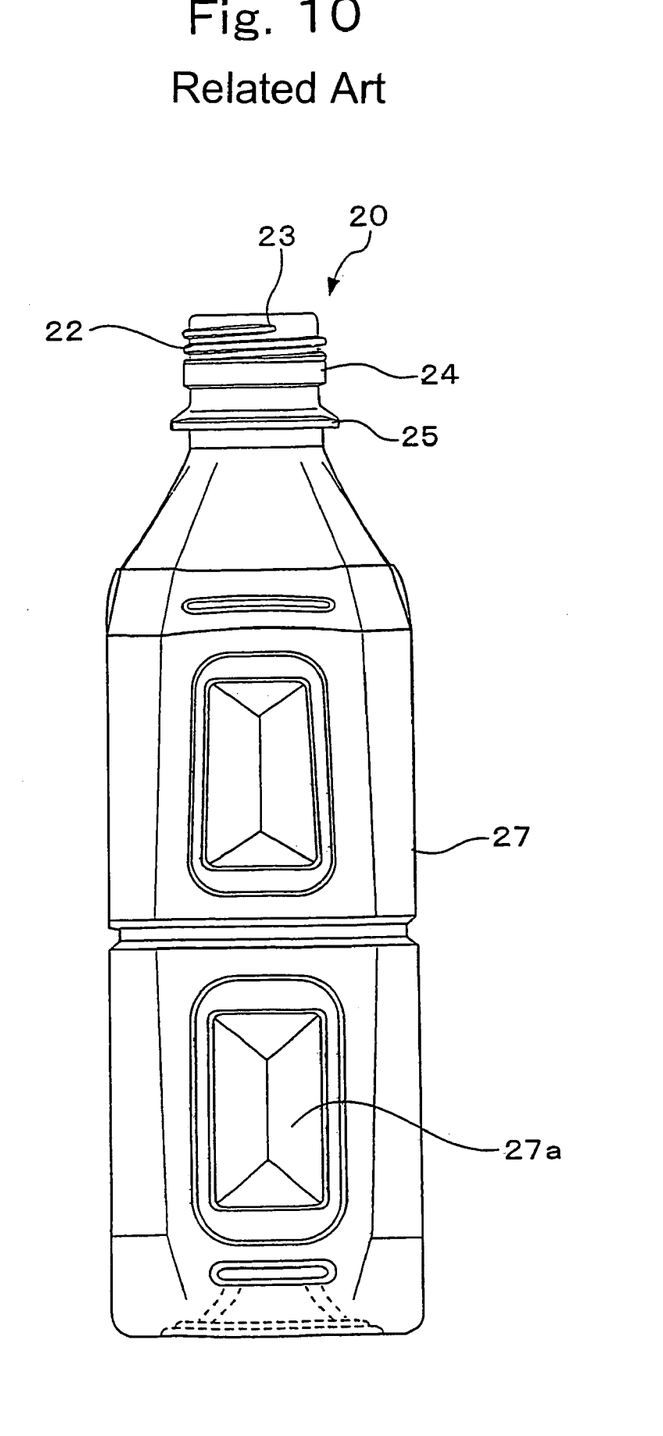
FIG. 10 is an entire front elevational view showing an example of the conventional heat-resistant bottle.
Figure 11:
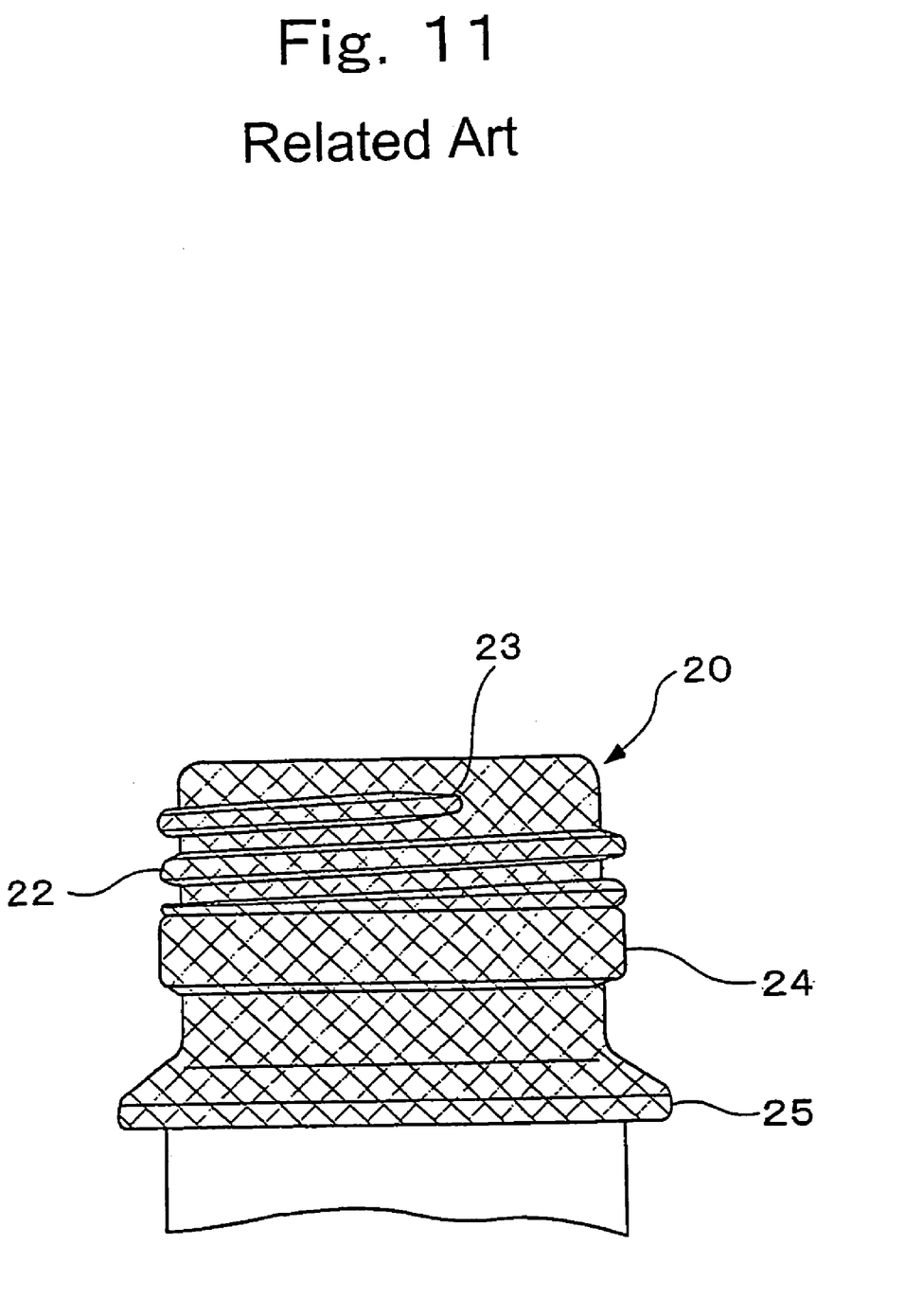
FIG. 11 is an enlarged front view showing the neck structure used in the bottle of FIG. 10.
Figure 12:
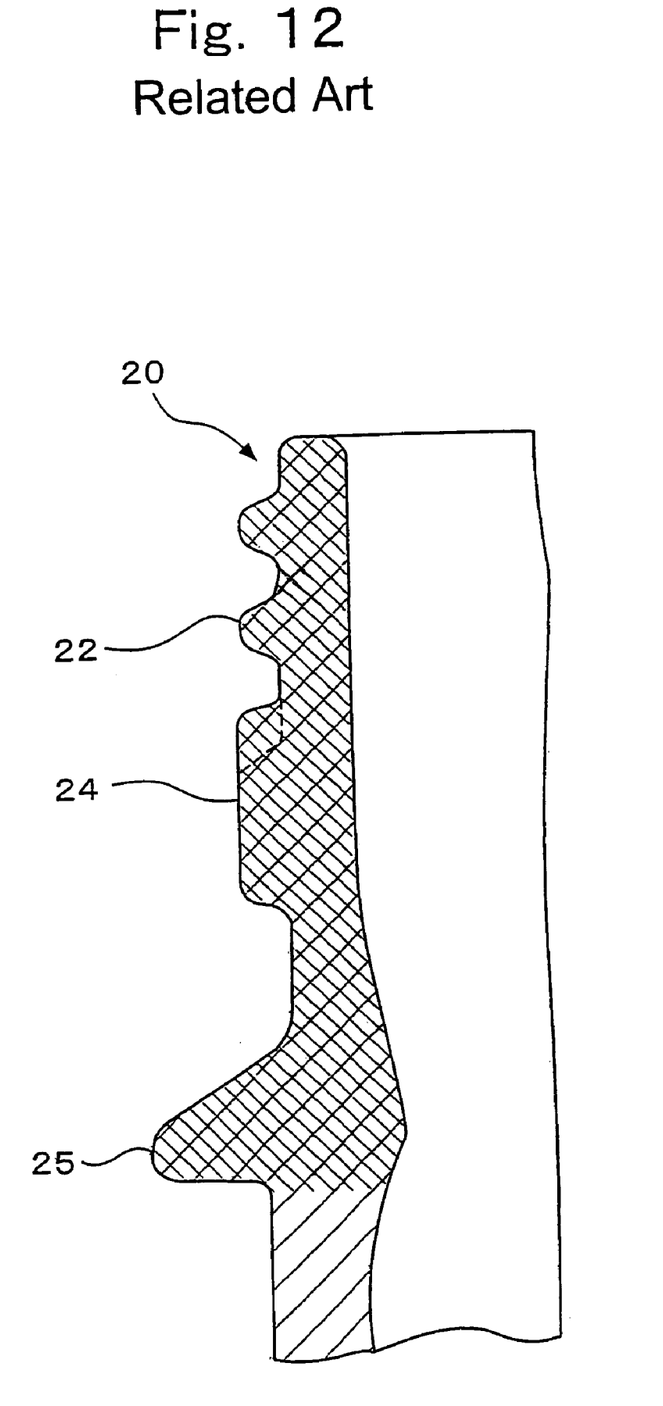
FIG. 12 is an enlarged, vertical section of a portion of the neck structure used in the bottle of FIG. 10.

FIG. 10 shows a typical PET bottle to be filled with tea, fruit juice, and the like. FIGS. 11 and 12 show a typical heat-resistant neck 20. The entire neck is in the whitened state as a result of the thermal crystallization treatment. Under the thread ridge 22 there is a bead ring 24, which is jointly used with a pilfer-proof cap to prevent the bottle from being opened by improper handling or by malfunction. The heat-resistant neck has also a neck ring 25. The mesh hatching over the heat-resistant neck 20 in FIGS. 11 and 12 shows the neck in the whitened state caused by the thermal crystallization. (This hatching is omitted in FIGS. 10.)

Figure 7:
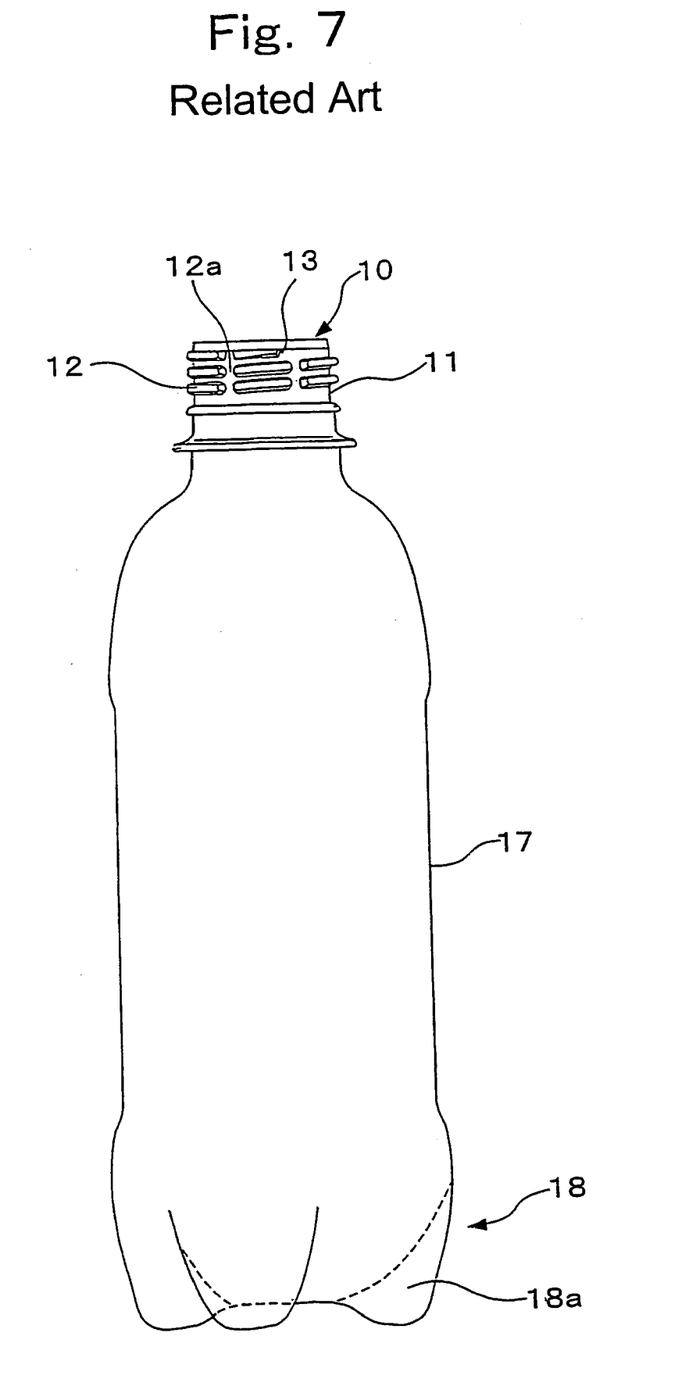
FIG. 7 is an entire front elevational view showing an example of conventional bottle used for a carbonated beverage.
Figure 8:
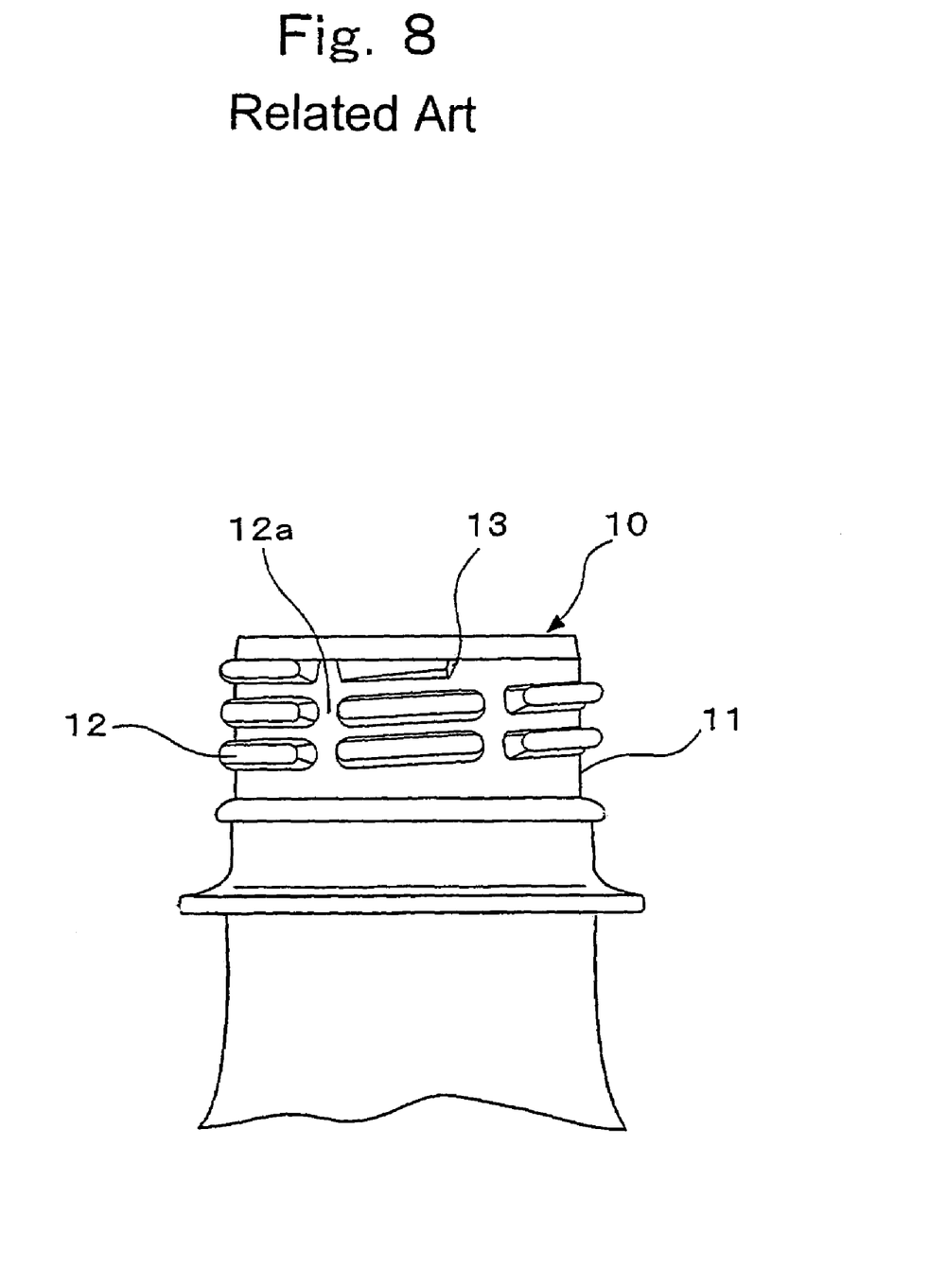
FIG. 8 is an enlarged front elevational view of the neck structure used in the bottle of FIG. 7.
Figure 9:
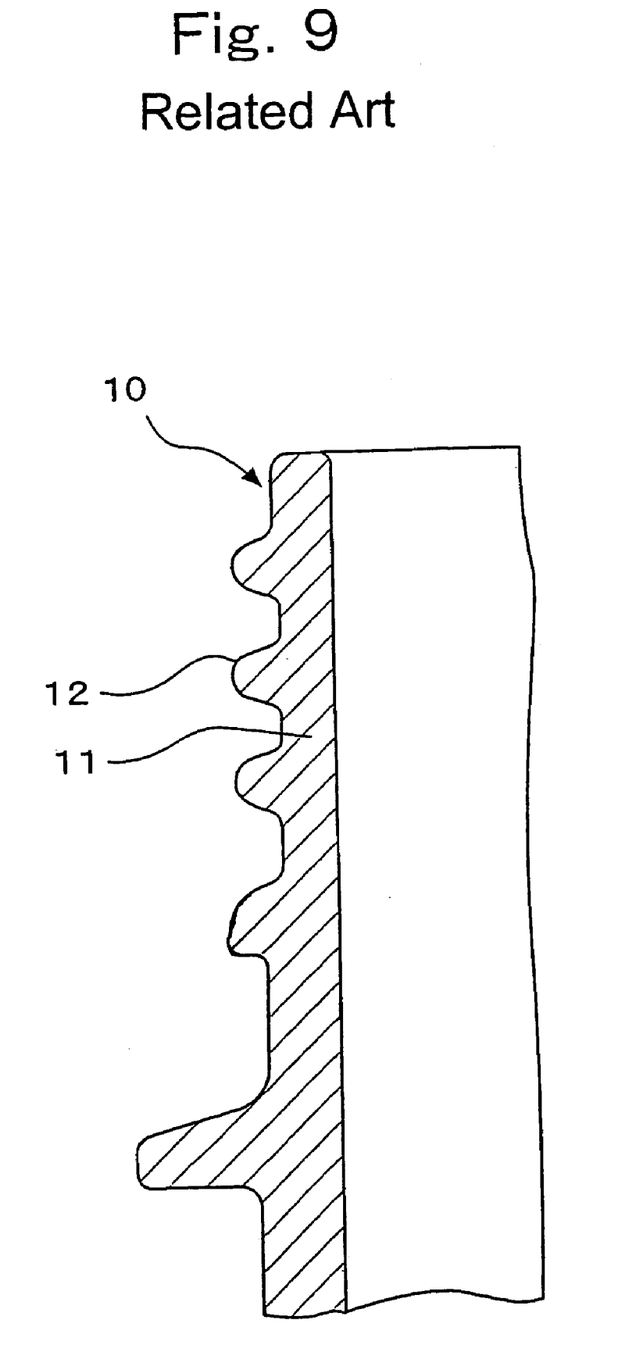
FIG. 9 is a partially enlarged, vertical section showing the structure of the conventional neck of FIG. 7.

Meanwhile, Japanese patent application No. P1995-267235 has a description on the PET bottle to be used for carbonated beverages. FIG. 7 is an entire view of a typical PET bottle to be used for carbonated beverages. FIGS. 8 and 9 show a typical example of the so-called pressure-tight neck 10 of the PET bottle shown in FIG. 7.

The pressure-tight neck 10 of the PET bottle shown in FIGS. 7, 8, and 9 is not thermally crystallized, and therefore, is in a clear state. The bottle comprises body 17 in a cylindrical shape and bottom 18 in the so-called petaloid shape, in which multiple legs 18a are projected downward to improve the pressure-resisting property of the bottle. The pressure-tight neck 10 is provided with an intermittent thread ridge 12, which has missing portions in between the segments of the thread ridge. These missing portions 12a are used as the gas venting grooves to allow the inner pressure of carbon dioxide gas to escape through the grooves when the bottle is uncapped.

In recent years, utilization of PET bottles has been expanding in various applications, and there is a need for a neck having both the heat-resisting property and the gas-venting property, rather than the neck having either property.

For instance, a PET bottle having the heat-resistant neck is used for filling the contents at a high temperature or is treated at a high temperature for pasteurization. Then, when the bottle is left to cool to room temperature, the bottle inside is under a reduced pressure. Sometimes the round wall of the bottle caves in, and the bottle deforms. (In many cases, the bottle is provided with deformable vacuum-absorbing panels in the portions of body walls to absorb the reduced pressure. See the vacuum-absorbing panel 27a in the body wall 27 in FIG. 10.) In the heat-resistant neck 20, there has been no mechanism corresponding to the gas-venting groove, such as the missing portions 12a in the intermittent thread ridge 12 of the pressure-tight neck 10. As a result, outside air bursts into the bottle at the moment when the bottle is uncapped, and the contents spout out under the effect of the force with which the bottle recovers from the reduced pressure condition. The spillover may happen to spoil the clothes.

Even with uncarbonated contents, such as fruit juices, there are still cases where the contents fall into a pressurized condition because of gas evolution due to a change over time. In such a case, there is a fear that the contents may spout out when the cap is removed from the heat-resistant neck 20.

The pressure-tight PET bottles for carbonated beverages, such as shown in FIG. 7 are finding more and more applications that require a pasteurization process using hot shower at a high temperature, which process is conducted after the bottles have been filled with beverages. Therefore, there is a need for the neck having a heat-resistant property and also a mechanism corresponding to the gas-venting groove found in the pressure-tight neck, to deal with the above-described problem of the contents that spill over or spout out of the bottle. In the case of the pressure-tight neck 10 having the missing portions 12a in the thread ridge, the problems caused by the missing portions 12a include undesired deformation due to thermal crystallization. As the neck is deformed, the screw engagement with the cap gets out of order, and the sealing property of the bottle decreases greatly.

The above problems are attributable to the differences in the resin flow and in the cooling/solidifying behavior observed between the intermittent thread ridge 12 and the missing portions 12a during the injection molding process. It is considered that due to these differences, surface sinks inevitably occur on the top surface of the neck 10 at places corresponding to the positions of the missing portions 12a. In addition, the neck would have a shape distorted from the circular shape.

As another problem, there occur similar surface sinks also on the top surface of the neck at the place corresponding to the vicinity of the starting and ending points of the intermittent thread ridge 12.

The thickness of the round wall 11 of the pressure-tight neck 10 is also a factor affecting the extent of undesired deformation, such as the above-described surface sinks. This deformation can be inhibited by increasing the thickness. However, from the aspects of productivity, cost reduction, and resources saving of the PET bottles, it is still difficult in reality to inhibit this undesired deformation within a practical range of the thickness.

This invention has been made to solve the above-described problems. The technical object of this invention is to provide a neck having a gas-venting structure and a structure capable of controlling surface sinks and deformation caused by thermal crystallization. Thus, the object of this invention is to provide a highly safe neck that can be used widely in the field of heat-resistant containers, pressure-tight containers, and heat-resistant and pressure-tight containers.

DISCLOSURE OF THE INVENTION

The means to solve the above-described technical problems exists in the configurations that a neck of a synthetic resin bottle comprising a gas-venting groove, which has been formed in thread ridge disposed on the outer wall of round wall of said neck, to serve as the path for venting gas in the vertical direction, while leaving a part of the thread ridge up to a certain height, wherein the entire neck is whitened by means of thermal crystallization.

Under the intermittent thread ridge structure found in the above-described conventional pressure-tight neck, the thermal crystallization treatment results in the development of large surface sinks on the top surface of the neck at places corresponding to the positions of the missing portions of the thread ridge, presumably for the reason described below.

Preform in the shape of a test tube is injection-molded and is used in the biaxial drawing and blow-molding process. In this injection molding, the resin is injected from the place of preform bottom and is flown upward to the place where the top surface of the neck is formed. During this process, a large difference in the resin flow path is found between the thread ridge portion and the missing portions. Because the neck portion is at the end of the flow, the resin temperature is dropping. Due to an influence of the flow path, there is an increasing difference in the molecular orientation. After the final stage of resin flow, the molded preform immediately goes on with the mold clamping and cooling processes. Thus, too short a period of time is left to loosen the molecular orientation, and the difference in the molecular orientation, which has developed during the flow, stays behind in the molded product under these circumstances. Therefore, it is presumed that through the influence of this remaining molecular orientation state, there is a large place-dependent difference in the extent of shrinkage found as one of the thermal crystallization behaviors.

It should be noted here that, if the neck has a fully enlarged thickness, then the difference in the resin flow behavior becomes small between the thread ridge portion and the missing portions. In that case, the difference in the molecular orientation state, which is created during the resin flow, can be reduced. However, as described above, from the aspects of productivity, cost reduction, and resources saving of the PET bottles, it is difficult to reduce the difference in molecular orientation fully within a practical range of thickness.

The disclosed configuration was created, based on the above-described presumption. When the gas-venting groove is cut out vertically in thread ridge, while leaving a part of the thread ridge up to a certain height, it is possible to reduce the difference in the resin flow state between the thread ridge portion and the gas-venting groove portion or portions. Thereby the surface sinks on the top surface of the neck can be controlled.

In addition, the conventional pressure-tight neck has a tendency in which the neck wall bulges outward due to the thermal crystallization treatment and totally deforms from the circular shape at the upper neck positions corresponding to the positions of the missing portions of the intermittent thread ridge structure. The screw engagement with the cap also causes a problem. The disclosed configuration also enables this distortion to be inhibited effectively.

As described above, the neck having the gas-venting function can be also provided with the heat-resistant property to be imparted by the thermal crystallization. Such a neck can be used to prevent the contents from spilling over under the effect of the force with which the bottle recovers from the reduced pressure condition at the moment when the bottle is uncapped or to prevent the contents from spouting out of the pressurized bottle at the moment of uncapping. Thus, safe necks, and safe bottle-like containers, too, can be provided.

How much height of the thread ridge is left for the gas-venting groove portions can be determined for any purpose, giving due consideration to the sink- and distortion-preventing effect, the extent of inner pressure caused by the contents, the gas-venting effect, and the speed of air bursting into the bottle under a reduced pressure condition.

The disclosed means exists in the configuration that the gas-venting groove or grooves are formed leaving a height ¼ to ½ as much as the full height of the thread ridge.

Under the above-described configuration, there can be provided a neck with a balance maintained between the sink- and distortion-preventing effects and the gas-venting property.

The disclosed means exists in the configuration that at least a gas-venting groove specified above is formed at a central angle in the range of 0 to 360 degrees from the starting point of the thread ridge.

In this configuration, the gas venting property can be secured, and the surface sinks on the top surface of the neck can be reduced in their extent. The screw engagement with the cap also becomes stable.

The disclosed means exists in the configuration that the gas-venting groove or grooves specified above are disposed nearly straight in the vertical or slantwise direction across the rows of the spiral thread ridge.

Usually the thread ridge forms a spiral line of two or three coils. Under this configuration, the gas-venting groove or grooves are disposed nearly straight in the vertical or slantwise direction across the rows of the spiral thread ridge, thus allowing smooth gas venting. However, it should be noted here that a set of straight gas-venting grooves is disposed not only in the vertical direction, but may also be in the oblique direction.

The disclosed means may include corners of the gas-venting groove that are rounded and have a curvature radius of at least 0.3 mm.

Under this configuration, the corners of each gas-venting groove are rounded so that any change in the resin flow can be gradual in the area including from the crest of the thread ridge to the bottom of the gas-venting groove. Thus, it is possible to inhibit effectively the undesired deformation of the neck caused by the thermal crystallization. Preferably the corners have a curvature radius of 0.3 mm or longer, and more preferably 0.5 mm or longer.

The disclosed means exists in the configuration that the neck specified above has a structure having both of the bead ring and the neck ring disposed below the thread ridge and that the neck including the bead ring and the neck ring is whitened by the thermal crystallization.

Under this configuration, the bead ring and the neck ring are disposed, if necessary, in the lower portion of the neck, which is entirely whitened by the thermal crystallization. These bead ring and neck ring comprise the thick portions surrounding the neck, and serve to inhibit surface sinks on the top surface of the neck and to protect the neck against any peripheral distortion from the circular shape. This is possible because these rings are one of the factors that ease the molecular orientation caused by the resin flow at the time when preform is molded.

The disclosed means exists in the configuration that a starting extension (4a) and an ending extension (4b) are formed at the start and the end, respectively, of the thread ridge by reducing the width and the height gradually.

Under this configuration, a drastic change in the resin flow state can be avoided in the vicinity of the starting and ending portions of the thread ridge when the preform is injection molded. Thus, it is possible to minimize surface sinks on the neck top surface at positions corresponding to the vicinity of the starting and ending extensions.

The disclosed means exists in the configuration that the starting extension and the ending extension specified above are formed at a central angle in the range of 30 to 150 degrees.

Under this configuration, surface sinks can be fully controlled on the neck top surface at positions corresponding to the vicinity of the extensions, while maintaining the ability of the neck to screw together with the cap.

PREFERRED EMBODIMENTS OF THE INVENTION

This invention is further described with respect to a preferred embodiment, now referring to FIG. 1 through FIG. 6.

Figure 1:
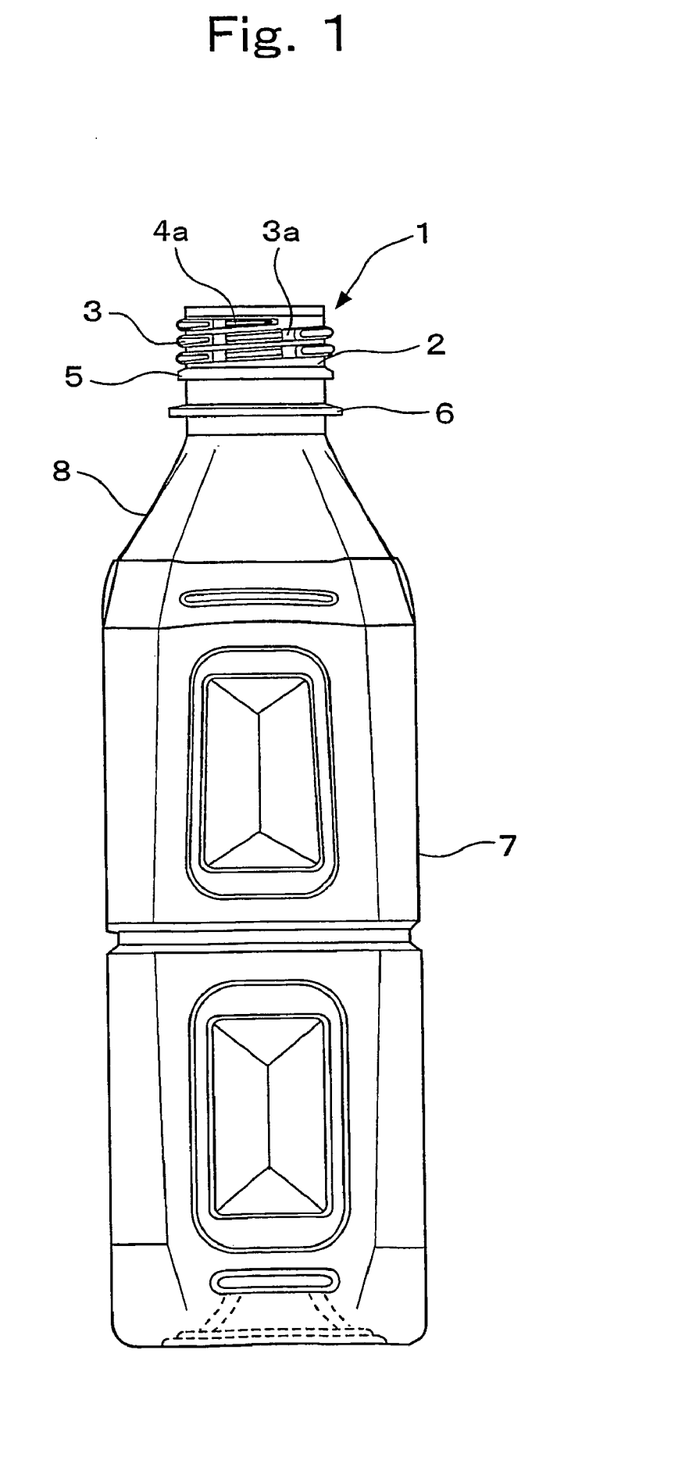
FIG. 1 is a front elevation view of the entire bottle in the embodiment of this invention.

FIG. 1 is a front elevational view of the bottle in the preferred embodiment of this invention. The bottle is a biaxially drawn and blow-molded bottle made of a polyethylene terephthalate resin. The neck 1 of this invention stands on the upper end of the body 7 in the bottomed square shape by way of shoulder 8 in the truncated pyramid shape.

The thread ridge 3 on the neck 1 is carved at a length of about two and a half coils in the upper half area on the outer surface of the cylindrical neck wall 2. The bead ring 5 and the neck ring 6 are disposed in the corresponding lower half area of the round wall 2.

Figure 2:
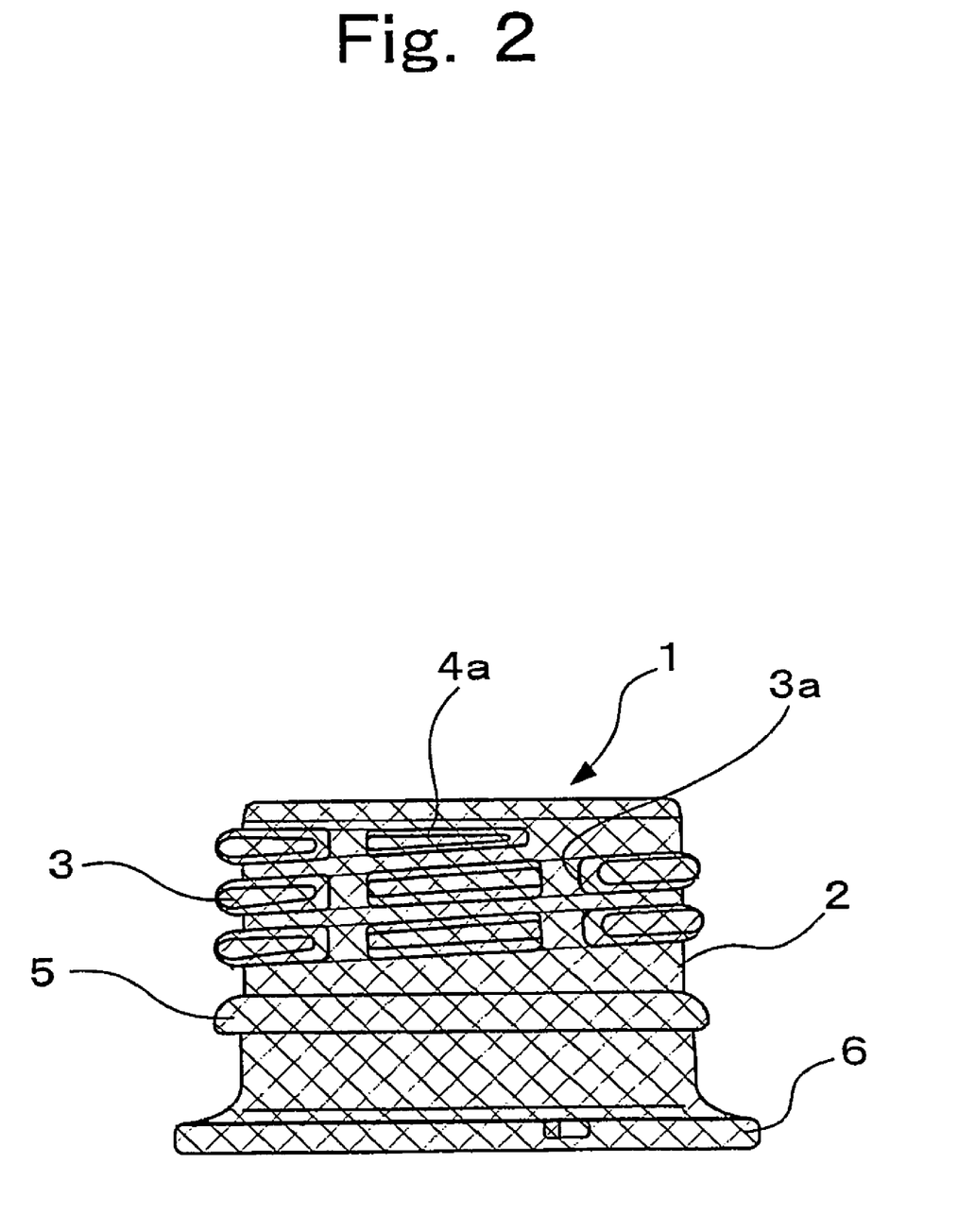
FIG. 2 is an enlarged view of the neck in the embodiment of this invention shown in FIG. 1.
Figure 3:
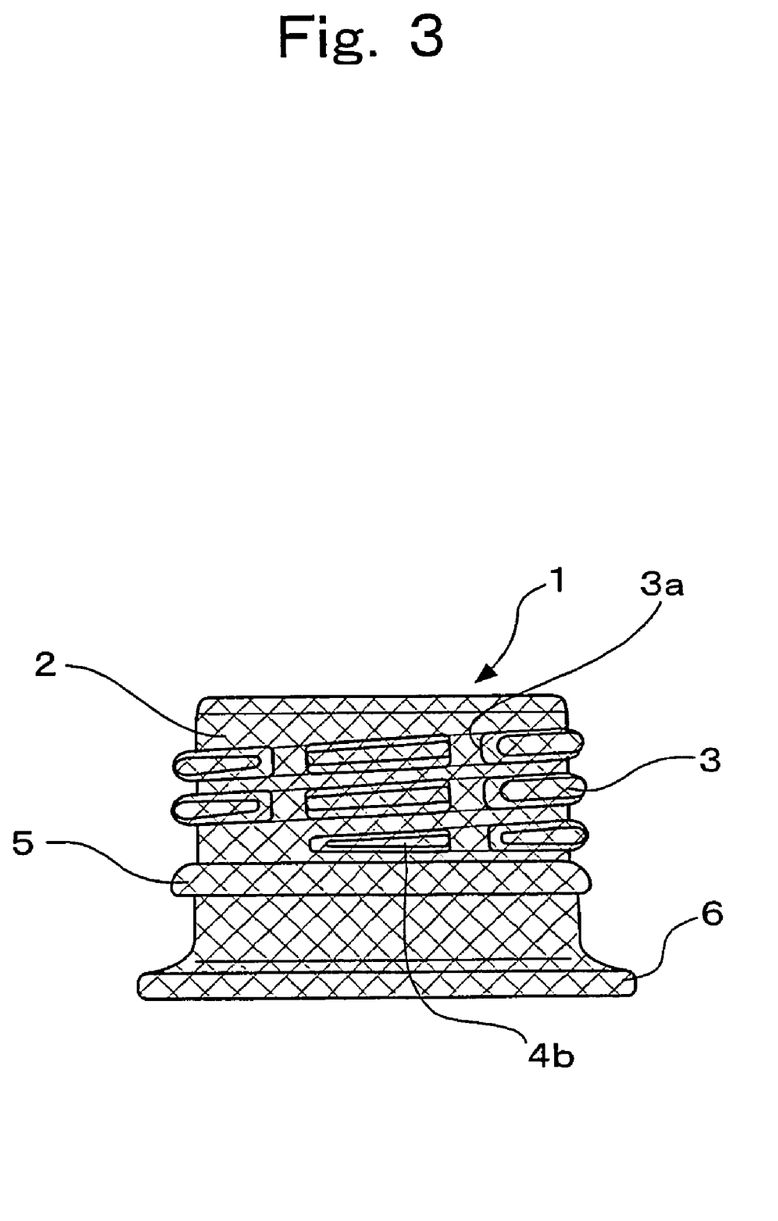
FIG. 3 is an enlarged rear view of the neck in the embodiment of this invention shown in FIG. 1.
Figure 4:
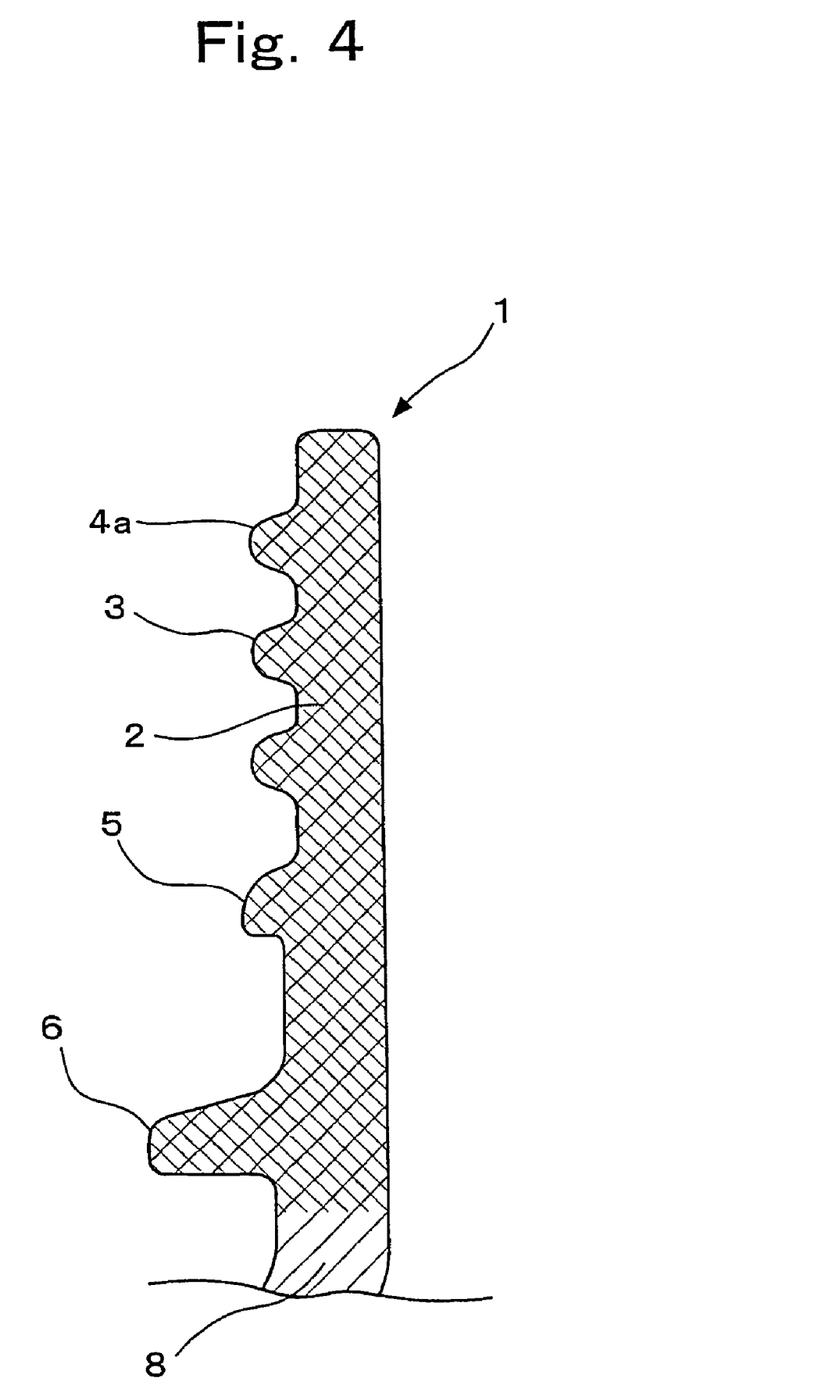
FIG. 4 is a partially enlarged, vertical section of the neck in the embodiment of this invention shown in FIG. 1.
Figure 5:
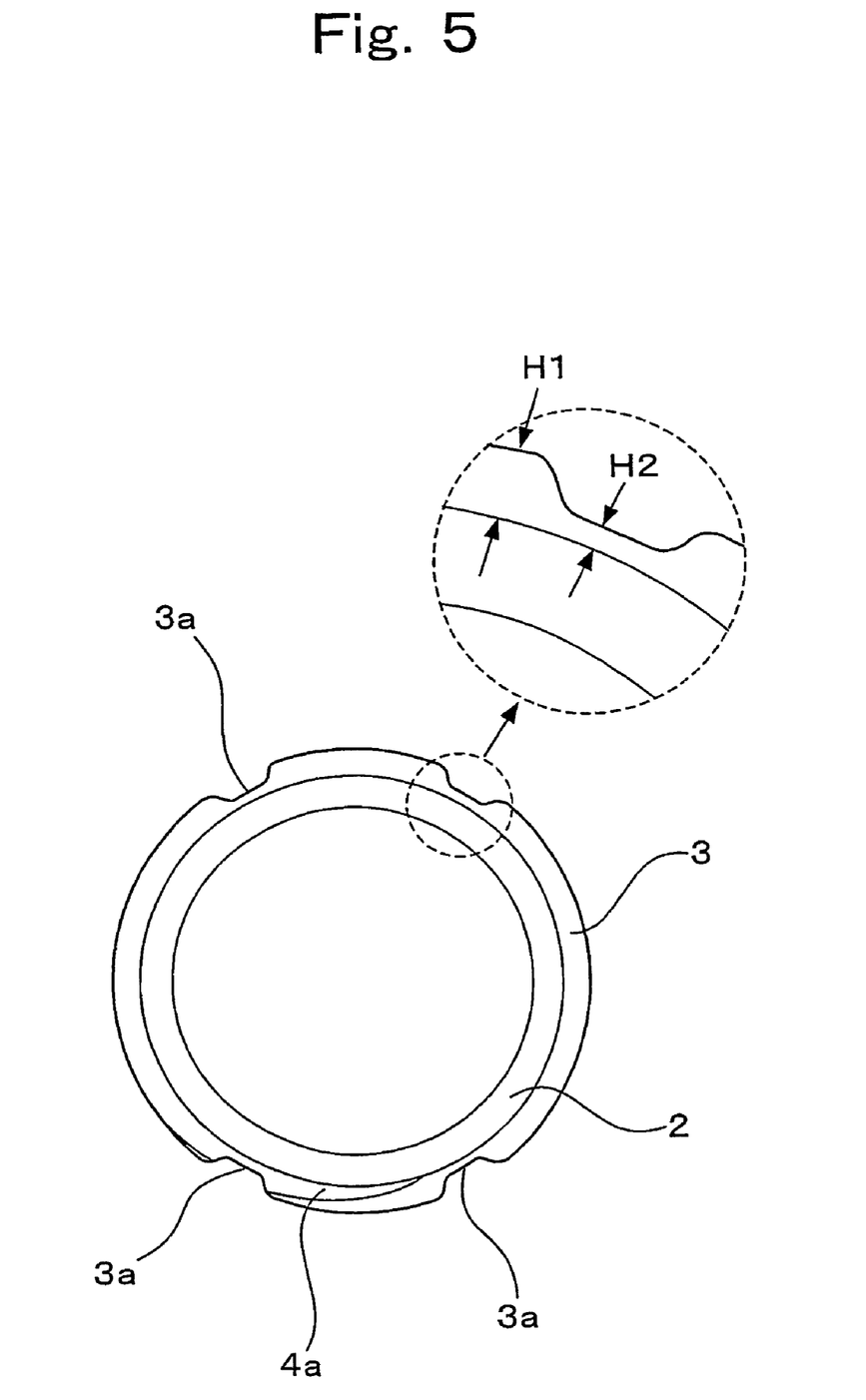
FIG. 5 is a plan view of the neck showing the thread ridge of the neck shown in FIG. 1, with an enlarged portion of the gas-venting groove in the embodiment of this invention.

The neck 1 of this embodiment is whitened by the thermal crystallization. The mesh hatching over the neck 1 in FIGS. 2, 3, and 4 shows the neck in the whitened state. (This hatching is omitted in FIGS. 1 and 5.) In this embodiment, the neck 1 was whitened down to the area right under the neck ring 6. However, depending on the end use, whitening can also be applied to the area covering from the lower end of the neck ring 6 to the upper end of the shoulder 8. Furthermore, there may be a case where a part of the neck is weakly whitened.

The straight gas-venting grooves 3a are disposed vertically at 4 places around the neck, while leaving a part of the thread ridge up to a certain height. The remaining height H2 in the groove areas is set at a height about ⅓ as much as the full height H1 of the thread ridge 3. In the portions of the gas-venting grooves 3a where the thread ridge has been cut out, the grooves are in the shape of a flat-bottomed valley with gentle slopes on both sides, and each corner of the gas-venting grooves 3a is rounded. Because of this rounded corners, any change in the resin flow behavior would be gradual in the area including from the crest of the thread ridge 3 to the bottom of the gas-venting groove 3a (See FIGS. 2, 3, and 6). Preferably this bank in the arc shape has a curvature radius of 0.3 mm or longer, and more preferably 0.5 mm or longer.

The places and the number of the above-described gas-venting grooves 3a, as well as the remaining height H2 of the thread ridge 3, can be determined for any purpose, giving due consideration to the improving effects on the surface sinks and distortion, the extent of inner pressure caused by the contents, and the gas-venting effect.

Figure 6:
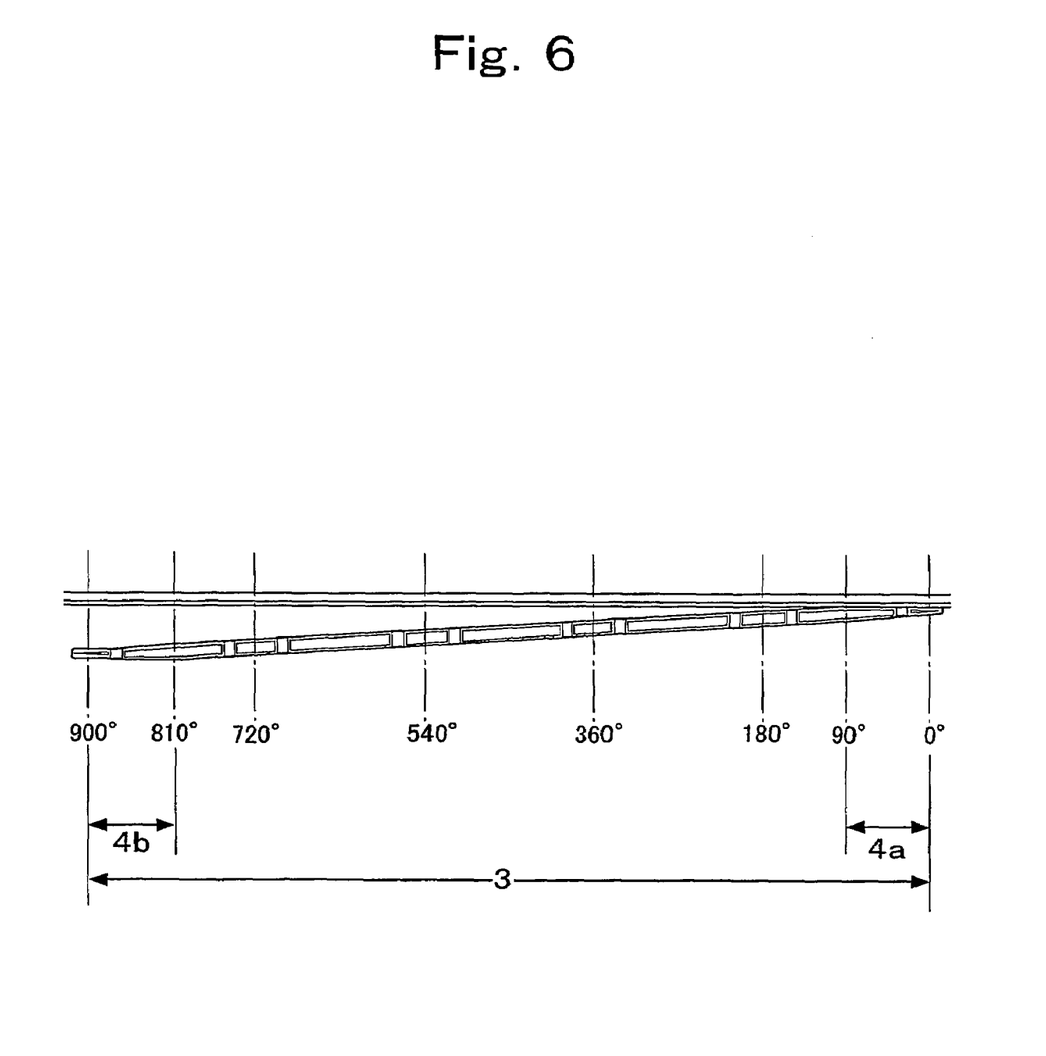
FIG. 6 is a schematic diagram depicting the spread of the thread ridge in the embodiment of this invention shown in FIG. 1.

The starting extension 4a and the ending extension 4b are disposed, respectively, at the start or upper end and at the finish or lower end of the thread ridge 3 (See FIGS. 2, 3, and 6). These extensions of the thread ridge 3 go as far as a central angle of 90 degrees in this embodiment, while decreasing both the width and the height gradually. The starting extension 4a and the ending extension 4b are not limited to the length corresponding to the central angle of 90 degrees, but can be determined to achieve a full effect normally in the range of 30 to 150 degrees, while paying attention to the sink-preventing effect and the ability of the neck to screw together with the cap.

In the case where the conventional pressure-tight neck 10 shown in FIGS. 8 and 9 was thermally crystallized for whitening, there occurred large sinks at positions on the top surface of the neck 10 corresponding to the positions of the missing portions 12a and the upper end 13 of the intermittent thread ridge 12. The sealing went out of order when the cap was screwed on the neck. In contrast, the sealing can be secured when the cap is screwed on the neck 1 of this embodiment. The shape of the gas-venting grooves 3a of this invention and the starting and ending extensions 4a and 4b have proved effective. Now it has become possible to use a neck similar in the shape of the conventional pressure-tight necks by giving the heat-resisting property to the neck.

The action and effect of this invention are not limited to the shape of the neck described in the above embodiment, but are commonly achieved in those necks provided with intermittent thread ridge. For instance, even a neck without bead ring and neck ring can be used to control the surface sinks on the top surface of the neck effectively and to minimize undesired distortion from the circular shape of the neck, provided that the remaining height H2 of the gas-venting groove 3a is set suitably.

INDUSTRIAL APPLICABILITY

This above-described configuration has the following effects:

The gas-venting groove or grooves are formed so as to leave a part of the thread ridge up to a certain height. This remaining portion having a certain height makes it possible to reduce the difference in the resin flow state between the thread ridge portion and the portions where gas-venting grooves are formed. Consequently, it is possible to minimize effectively the surface sinks on the top surface of the neck and the undesired distortion from the circular shape of the neck, both of which are caused by the thermal crystallization treatment.

As described above, the neck having the gas-venting function can be also provided with the heat-resisting property, which is imparted by the thermal crystallization. Such a neck can be used to prevent the contents from spilling over under the effect of the force with which the bottle recovers from the reduced pressure condition at the moment when the bottle is uncapped or to prevent the contents from spouting out of the pressurized bottle at the moment of uncapping. Thus, safe necks, and safe bottle-like containers, too, can be provided.

The gas-venting groove or grooves thus formed may have a height ¼ to ½ as much as the full height of the thread ridge. Because of this groove bottom height, there can be provided a neck with a balance between the sink- and distortion-preventing effects and the gas-venting property.

At least a gas-venting groove may be formed at a central angle in the range of 0 to 360 degrees from the starting point of the thread ridge. The gas-venting groove or grooves thus formed secure the gas venting property, minimize the extent of surface sinks on the top surface of the neck, and stabilize the screw engagement with the cap.

A gas-venting groove or grooves may be disposed nearly straight in the vertical or slantwise direction across the rows of the spiral thread ridge. Under this configuration, gas can be vented smoothly.

The corners of each gas-venting groove may be rounded so that any change in the resin flow can be gradual in the area including from the crest of the thread ridge to the bottom of the gas-venting groove. Thus, it is possible to inhibit effectively the undesired deformation of the neck caused by the thermal crystallization.

The bead ring and the neck ring may comprise the thick portions surrounding the neck, and serve to inhibit surface sinks on the top surface of the neck and to protect the neck against any peripheral distortion from the circular shape. This is because these rings are one of the factors that ease the molecular orientation caused by the resin flow at the time when preform is molded.

The starting extension and the ending extension, with the width and the height reduced gradually, may be formed at the start and the end, respectively, of the thread ridge. Under this configuration, a drastic change in the resin flow state can be avoided in the vicinity of the starting and ending points of the thread ridge. Thus, it is possible to minimize surface sinks on the neck top surface at positions corresponding to the vicinity of the starting and ending portions of the thread ridge.

The starting extension and the ending extension may be formed at a central angle in the range of 30 to 150 degrees. Under this configuration, surface sinks can be fully controlled on the neck top surface at positions corresponding to the vicinity of the starting and ending portions of the thread ridge, while maintaining the ability of the neck to screw together with the cap.

The invention claimed is:

1. A neck of a synthetic resin bottle comprising a gas-venting groove, which has been formed in thread ridge disposed on the outer wall of round wall of said neck, to serve as the path for venting gas in the vertical direction, while leaving a part of the thread ridge up to a certain height,
wherein the entire neck is whitened by means of thermal crystallization, and the leaving the part of the thread ridge reduces unwanted deformation of the neck occurring during the thermal crystallization.

2. The neck of the synthetic resin bottle, according to claim 1, wherein said gas-venting groove has been formed leaving a height ¼ to ½ as much as the full height of the thread ridge.

3. The neck of the synthetic resin bottle, according to claim 1, wherein at least a gas-venting groove is formed at a central angle in the range of 0 to 360 degrees from the starting point of the thread ridge.

4. The neck of the synthetic resin bottle, according to claim 1, wherein said gas-venting groove or grooves are disposed nearly straight in the vertical or slantwise direction across the rows of the spiral thread ridge.

5. The neck of the synthetic resin bottle, according to claim 1, wherein corners of said gas-venting groove carved in the thread ridge are rounded and have a curvature radius of 0.3 mm.

6. The neck of the synthetic resin bottle, according to claim 1, wherein the neck has a structure in which said neck is also provided with a bead ring and a neck ring, which are disposed below the thread ridge and wherein the whitening treatment by means of thermal crystallization is applied to the entire neck including said bead ring and said neck ring.

7. The neck of the synthetic resin bottle, according to claim 1, wherein starting extension and ending extension, with the width and the height reduced gradually, are formed at the start and the end of the thread ridge.

8. The neck of the synthetic resin bottle, according to claim 7, wherein said starting extension and said ending extension are formed at a central angle in the range of 30 to 150 degrees.

* * * * *